United States Patent
Pashaei Soorbaghi (10) Patent No.: US 11,053,127 B2
(45) Date of Patent: Jul. 6, 2021

(54) MECHANICALLY ROBUST AEROGELS AND PREPARATION METHOD THEREOF

(71) Applicant: Fatemeh Pashaei Soorbaghi, Tehran (IR)

(72) Inventor: Fatemeh Pashaei Soorbaghi, Tehran (IR)

(*) Notice: Subject to any disclaimer, the term of this patent is extended or adjusted under 35 U.S.C. 154(b) by 111 days.

(21) Appl. No.: 16/231,291

(22) Filed: Dec. 21, 2018

(65) Prior Publication Data
US 2019/0135643 A1    May 9, 2019

Related U.S. Application Data

(60) Provisional application No. 62/609,424, filed on Dec. 22, 2017.

(51) Int. Cl.
| | |
|---|---|
| C01B 33/158 | (2006.01) |
| C01B 33/154 | (2006.01) |
| C01B 33/155 | (2006.01) |
| B82Y 30/00 | (2011.01) |

(52) U.S. Cl.
CPC ........ *C01B 33/1585* (2013.01); *C01B 33/154* (2013.01); *C01B 33/155* (2013.01); *B82Y 30/00* (2013.01); *C01P 2006/12* (2013.01); *C01P 2006/32* (2013.01)

(58) Field of Classification Search
CPC .. C01B 33/1585; C01B 33/154; C01B 33/155
See application file for complete search history.

(56) References Cited

U.S. PATENT DOCUMENTS

| | | | |
|---|---|---|---|
| 2017/0014792 A1* | 1/2017 | Bonnardel | B01J 13/0091 |
| 2017/0081201 A1 | 3/2017 | Kugimiya et al. | |
| 2018/0193825 A1* | 7/2018 | Kim | B01J 21/02 |

FOREIGN PATENT DOCUMENTS

KR    100896790 B1    5/2009

OTHER PUBLICATIONS

Li et al ("Improved mechanical and thermal insulation properties of monolithic attapulgite nanofiber/silica aerogel composites dried at ambient pressure", J Sol-Gel Sci Technol (2017) 82:702-711). (Year: 2017).*

Liu et al ("Novel three-dimensional halloysite nanotubes/silica composite aerogels with enhanced mechanical strength and low thermal conductivity prepared as ambient pressure". J Sol-Gel Sci Technol (2016) 80:651-659.). (Year: 2016).*

Haixia Yang, Feng Ye n, Qiang Liu, Shichao Liu, Ye Gao, Limeng Liu A novel silica aerogel/porous Si3N4 composite prepared by freeze casting and sol-gel impregnation with high-performance thermal insulation and wave-transparent, Materials Letters 138 (2015) 135-138.

* cited by examiner

*Primary Examiner* — Coris Fung
*Assistant Examiner* — Michael Forrest
(74) *Attorney, Agent, or Firm* — Bajwa IP Law Firm; Haris Zaheer Bajwa (57) ABSTRACT

A composition and method for producing the ultra-tough nanocomposite aerogel are disclosed. The ultra-tough nanocomposite aerogel may include a dispersion of at least one filler in an aerogel. This method is used to improve the mechanical properties of aerogel by preserving the microstructural and thermal properties of the aerogel, as the addition of the filler leads to an increase in the mechanical properties without any significant increase in the density.

10 Claims, 10 Drawing Sheets

MECHANICALLY ROBUST AEROGELS AND PREPARATION METHOD THEREOF

CROSS REFERENCE TO RELATED

The present invention application claims priority from U.S. Provisional Patent Application Ser. No. 62/609,424, filed on Dec. 22, 2017, entitled "MECHANICALLY ROBUST INORGANIC AEROGELS AND PREPARATION METHOD THEREOF" which is incorporated by reference herein in its entirety.

TECHNICAL FIELD

The present disclosure generally relates to aerogels, particularly relates to an ultra-tough aerogel with high porosity, and more particularly to an ultra-tough aerogel with enhanced thermal properties and preparation method thereof.

BACKGROUND

Silica aerogels are nanoporous materials with exceptional properties such as low thermal conductivity, low density, and high specific surface area. The microstructure of silica aerogel includes interconnected nanoparticles and nanosized pores in a three-dimensional (3-D) open-cell pearl-necklace network. The special properties of these nanomaterials make them appropriate for various applications such as thermal insulations, acoustic insulations, drug delivery, catalysis, and adsorption.

However, mechanical strength, elastic modulus, and consequently toughness of silica aerogels is much lower than dense silica; therefore, silica aerogels are easily cracked when subjected to external loads. This drawback hinders the wide applications of silica aerogels. There are two conventional strategies for improving the mechanical properties of the silica aerogel.

A first conventional strategy may entail addition of an organic moiety or organic filler for improving mechanical properties of the silica aerogel. Although using an organic moiety or organic fillers may improve the mechanical strength of the silica aerogel, thermal stability decreases due to the addition of organic moieties which further restricts the high-temperature applications of silica aerogels.

Another mechanical reinforcing strategy may entail addition of an inorganic filler as a reinforcement to the silica aerogel network. However, the addition of an inorganic filler to the silica aerogel network increases the density of the silica aerogel up to two times. Furthermore, when this method is utilized, the brittle nature of silica aerogels is preserved which results in a composite silica aerogel with low failure strain.

On the other hand, the transparency of silica aerogels in the infrared wavelength as high-temperature thermal insulators leads to a drastic increase in the radiative heat transfer in high-temperature insulation applications. This defect is a drawback for the high-temperature applications of silica aerogels.

Therefore, there is a need for developing a new method for producing an Infrared opaque and mechanically strong silica aerogel with high toughness without losing the thermal stability.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure is directed to an exemplary method for producing an ultra-tough nanocomposite silica aerogel. The method may include producing a pre-hydrolyzed silica precursor solution by hydrolyzing a silica precursor in a mixture of a solvent and a first acid catalyst, obtaining a modified tiller, producing a hydrolyzed silica-filler precursor solution by reducing the pH level of the pre-hydrolyzed silica precursor solution between 0.1-4 pH level by a second acid catalyst and dispersing the modified filler it the pre-hydrolyzed silica precursor solution in any order, the second acid catalyst may include one or more of organic acids and inorganic acids, producing a silica-filler gel by adding a basic catalyst to the hydrolyzed silica-filler precursor solution, and drying the silica-filler gel.

The above general aspect may have one or more of the following features. In an exemplary implementation, the silica precursor may include one or more of rice husk, aluminosilicate, silicates, alkoxysilanes, polysilylated organic molecules, silylated molecules, and water glass. In an exemplary implementation, the hydrolyzed silica-filler precursor solution may include the modified tiller in the range of 0.1-60 weight percent of the silica precursor in the silica-filler gel. Furthermore, in an exemplary implementation, the solvent may include water or an alcohol-water mixture, the alcohol may include one or more of methanol, ethanol, propanol, butanol, and other alkanols. In an exemplary implementation, the first acid catalyst may include one or more of oxalic acid, citric acid, and acetic acid. In addition, in an exemplary implementation, producing a pre-hydrolyzed silica precursor solution by hydrolyzing a silica precursor in a mixture of a solvent and a first acid catalyst may include producing the pre-hydrolyzed silica precursor by stirring, for 0.08-100 hour at 0-80° C. In an exemplary implementation, producing a hydrolyzed silica-tiller precursor solution by reducing the pH level of the pre-hydrolyzed silica precursor solution between 0.1-4 pH level by a second acid catalyst and dispersing the modified filler in the pre-hydrolyzed silica precursor solution in any order includes producing the hydrolyzed silica-filler precursor solution by stirring for 0.08-100 hour at 0-80° C., in an exemplary implementation, obtaining the modified filler includes obtaining a surface functionalized filler by introducing a function to a filler surface, the filler including one or more of graphene, graphite, clay, alumina, titania zirconia, silica, silicon carbide, metal oxides, semi-metal oxides, layered double hydroxides, silicates, and aluminosilicates, wherein the function includes hydroxyl group, hydroxyl terminated organic molecules, hydroxyl terminated organic-inorganic, obtaining a surface functionalized filler suspension by adding the surface functionalized filler to a mixture of alcohol and oligomer under either stirring for 0.08-24 hour or ultrasonication for 0.08-3 hour, the oligomer includes at least one of organic polymer or inorganic polymer with hydroxyl groups, the alcohol includes one or more of methanol, ethanol, propanol, butanol, and other alkanols, drying the surface functionalized filler suspension, and the drying includes one or more of ambient pressure drying in the range of 0.9-2 atmosphere, freeze drying, or supercritical drying. In an exemplary implementation, the basic catalyst includes one or more of alkaline earth metal hydroxides, alkali metal hydroxides, and ammonia. In an exemplary implementation, drying the silica-filler gel includes drying using one or more of ambient pressure drying under a pressure of 0.9-2 atmosphere, freeze drying or supercritical drying.

In another general aspect, the present disclosure is directed to an ultra-tough nanocomposite silica aerogel including at least one silica precursor and at least one modified filler, the ultra-tough nanocomposite silica aerogel has a toughness more than 600 kJ/m$^3$ and Rosseland extinction coefficient of at least 8500 m$^{-1}$ with a porosity greater than about 90 percent. The above general aspect may have one or more of the following features. In an exemplary implementation, the ultra-tough aerogel may include a failure strain of more than 45%. In an exemplary implementation, the ultra-tough silica aerogel may include a mechanical strength of more than 3.4 MPa. In an exemplary implementation, the ultra-tough silica aerogel may include a thermal conductivity of less than about 23 mW/(m.K) at a temperature in the range of 20-300° C. Furthermore, in an exemplary implementation, the ultra-tough silica aerogel may have a mass loss of less than 10 percent at 600° C. In an exemplary implementation, the ultra-tough silica aerogel may include a porosity greater than, about 90 percent and a surface area greater than about 700 m$^2$/g. In an exemplary implementation, the ultra-tough silica aerogel may have a homogeneous and monolithic structure.

In another general aspect, the present disclosure is directed to an exemplary method for producing an ultra-tough nanocomposite silica aerogel. The method may include producing a pre-hydrolyzed silica precursor solution by hydrolyzing a silica precursor in a mixture of a solvent and a first acid catalyst, obtaining a modified filler, producing a hydrolyzed silica-filler precursor solution by reducing the pH level of the pre-hydrolyzed silica precursor solution between 0.1-4 pH level by a second acid catalyst and dispersing the modified filler in the pre-hydrolyzed silica precursor solution in any order, the second acid catalyst may include one or more of organic acids and inorganic acids, producing a silica-filler gel by adding a basic catalyst to the hydrolyzed silica-filler precursor solution producing a modified silica-tiller gel by aging of the silica-filler gel under a given condition, the given condition includes a temperature ranging from 30-120° C. and a pressure ranging from 0.9-5 atmosphere for 1-1000 hour, hydrophobizing the silica-filler gel, and drying the modified silica-filler gel.

The above general aspect may have one or more of the following features. In an exemplary implementation, hydrophobizing the silica-filler gel may include adding a surface hydrophobization agent to a solvent under stirring at 25-60° C. for 1-100 hours, the surface hydrophobization agent includes hexamethyl disilazan (HDMZ), trimehylecholorosilan (TMCS), bis(trimethylsilyl acetamide) (BTSA), methyltrimethoxysilane (MTMS), methyltriethoxysilane (MTES), Vinyltrimethoxy silane (VTMS), phenyltrimethoxysilane (PTES), Dimethyl dimethoxy silane (DMDS) Trimethylmethoxy silane, trimethylchlorosilane (TMCA), bis(trimethylsilyl acetamide) (BTSA), and any combination thereof, the solvent includes one or more of alkanols and non-aprotic solvents.

BRIEF DESCRIPTION OF THE DRAWINGS

The drawing figures depict one or more implementations in accord with the present teaching, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is, therefore, not to be taken in a limiting sense, and the scope of the present disclosure is defined only by the appended claims.

The objective of exemplary embodiments of the present disclosure is to increase the mechanical properties of silica aerogel, specifically producing silica aerogel with high porosity and thermal stability. Exemplary methods increase failure strain and reduce fragility of silica aerogels and produce an ultra-tough aerogel with a wide range of density, particularly production of a low-density and infrared opacity silica aerogel. Some benefits from the exemplary method may include, but are not limited to, producing an ultra-tough nanocomposite aerogel with an improved thermal stability and improved radiative extinction coefficient.

Utilizing an exemplary method leads to an efficient process to produce a nanocomposite aerogel based on five main steps including pre-hydrolyzing a silica precursor solution under acidic condition, obtaining a modified filler, dispersing the modified filler in the pre-hydrolyzed silica precursor solution, hydrolyzing the silica-filler precursor solution by reducing pH, producing a silica-filler gel from the silica-filler precursor solution by gelation under basic condition followed by drying under a specific condition. A main benefit from utilizing an exemplary method may include applying two hydrolyzing steps separately before and after filler addition to minimize interruptions made by filler during the hydrolysis process of the silica precursor solution. Some additional benefits from utilizing an exemplary method may include developing an effective process for functionalizing the filler surface using a surface function to improve dispersion of the filler in the silica aerogel. In an exemplary method, the surface functionalized filler may be obtained by introducing a function to the surface of the filler and mixing with a mixture of alcohol and oligomer, followed by drying under a specific condition. The oligomer may include one or more organic polymer or inorganic polymer with hydroxyl groups. The alcohol may include one or more of methanol, ethanol, propanol and other alkanols. In an exemplary embodiment, the specific condition for drying may include one or more of ambient pressure drying in range of 0.9-2 atmosphere, freeze drying, or supercritical drying.

Some benefits from utilizing exemplary methods may include, but are not limited to, developing an effective method for aging and hydrophohizing of aerogel.

Throughout this disclosure, the term "nanocomposite aerogel" refers to aerogel containing a filler which has one, two, or three dimensions of less than 1000 nanometers (nm). The filler may be in any shape including plate, tube, rod, or any combination thereof.

Throughout this disclosure, the term "toughness" refers to the amount of energy per unit volume that aerogel may absorb before failure. Toughness may be determined by integrating the stress-strain curve, according to equation 1:

$$\text{Toughness} = \frac{\text{Energy}}{\text{volume}} = \int_0^{\varepsilon_f} \sigma d\sigma \quad (1)$$

where $\varepsilon$ is strain, $\varepsilon_f$ is the strain upon failure, and $\sigma$ is stress.

Throughout this disclosure, the term "ultra-tough" refers to the materials that have a toughness more than 300 kJ/m³.

In an exemplary embodiment, the bulk density of the samples may be measured using mass to volume ratio.

In an exemplary embodiment, the term "porosity" may be calculated by the following:

$$P = \left(1 - \frac{\rho_a}{\rho_s}\right) \times 100 \quad (2)$$

where $\rho_a$ is the density of silica aerogel, and $\rho_s$ is the density of bulk silica.

In an exemplary embodiment, the temperature dependence of radiative heat transfer may be calculated by diffusion approximation equation:

$$k_r = \frac{16\sigma_B n^2 T^3}{3K_\lambda(T)\rho_a} \quad (3)$$

Where $\sigma_B$ is the Stephan Boltzmann constant that equals $5.6704 \times 10^{-8}$ Wm$^{-2}$K$^{-4}$, T is temperature, $\rho_a$ is the density of the aerogel, n is the refractive index, and $K_\lambda$ is Rosseland's extinction coefficient.

Throughout this disclosure, the term aerogel refers to porous solid whit more than 60% porosity, in which more than 30% of pores are smaller than one micron.

In an exemplary embodiment the Rosseland's mean extinction coefficient depends on the intrinsic properties of the material such as, but not limited to, silica and silica-filler aerogel, electromagnetic wavelength of the incident wave and temperature of the material. Silica aerogels is transparent in the wavelength range lower than 25 μm. Hence, the infrared wavelengths under 25 μm may cover the transparent zone. The extinction coefficient may be calculated using equation 4:

$$\frac{1}{K_\lambda} = \frac{\int_0^\infty \frac{1}{k_\lambda} \frac{\partial e_{b\lambda}}{\partial T} d\lambda}{\int_0^\infty \frac{\partial e_{b\lambda}}{\partial T} d\lambda} = \int \frac{1}{k_\lambda} \frac{\partial e_\lambda}{\partial e_{b\lambda}} d\lambda \quad (4)$$

where $e_{b\lambda}$ and $c_b$ are total and spectral emissivity power of the black body, respectively.

Further $k_\lambda$ is spectral extinction and $K_\lambda$ represents Rosseland's mean extinction coefficient.

$k_\lambda$ is calculated using the light transmission for each wavelength. The equation 4 is applied in the infrared range lower than 25 μm.

Exemplary silica aerogel produced using exemplary methods may be applied as a thermal insulator because of its low thermal conductivity as well as high thermal stability. High thermal stability of the exemplary silica aerogel allows for its use in the fireproofing applications in refractories and constructions. Moreover, exemplary nanocomposite silica aerogel exhibits high mechanical strength and may be applicable where high mechanical strength is an essential requirement. In addition, exemplary silica aerogel may be used for preparing aerogel blankets and may be used as an acoustic insulation. Due to the high specific surface area, exemplary silica aerogel may also be utilized as an absorbent for example in, but not limited to, air- and water-purification. In an exemplary embodiment, exemplary silica aerogel may)e used in powder, monolithic form.

Aerogel Production

In an exemplary embodiment, sol-gel preparation may be entail two different methods including one-step method using a basic or an acidic catalyzer and the other method is a two-step method using an acidic followed by using a basic catalyzer. Since condensation and hydrolysis reactions may be related to pH, the pores morphology corresponding to each abovementioned method may be different.

In an exemplary embodiment, after the polymerization stage, to improve mechanical properties of the weak solid skeleton of the gel and to complete the polymerization stage, an exemplary aging step may be added to the fabrication process. In some cases, subsequent to gel formation, surface modification of silica aerogels may be conducted by utilizing one of surface modifiers including surface activators, cross-link developer agents, and organic templates. Additionally, the surface modifiers may be applied for minimizing shrinkage of_the_gel_and preventing fractures by decreasing the capillary forces.

Different exemplary methods may be utilized for drying these materials. These methods may include: Supercritical drying, ambient pressure drying, and Freeze drying. Supercritical drying, may be based on putting the sol-gel at a solvent supercritical point and extracting the solvent at this point. At a higher than supercriticid point, there is no surface tension, hence, the solution may be extracted without being destructed. Accordingly, in this exemplary method, compared to conventional methods, solvent extraction may be done with a superior quality.

Producing of an Ultra-Tough Silica Aerogel Nanocomposite

Nanocomposite production may be utilized for improving mechanical and thermal properties of many materials. But improving the mechanical and thermal properties in the nanocomposite materials strongly depends on the tiller dispersion method. The filler dispersion in the nanocomposite materials may be tuned by utilizing a proper filler modification process. Exemplary Silica aerogel may have a porous structure and a fine structure which may lead to superior properties, such as high porosity and high specific surface area. Since the silica aerogel have a fine microstructure, any changes in a sol-gel process such as filler addition may negatively impact the quality of the silica aerogel. Addition of a filler may affect sol-gel process by hindering completion of the hydrolysis and gelation processes. Thereby, in some instances, the porosity and the surface area of the silica aerogel may decrease due to the addition of the filler. Therefore, there is a need for developing an improved sol-gel, process to produce a silica nanocomposite aerogel by preserving and improving the properties of the aerogel in the presence of a filler.

Figure 1A:
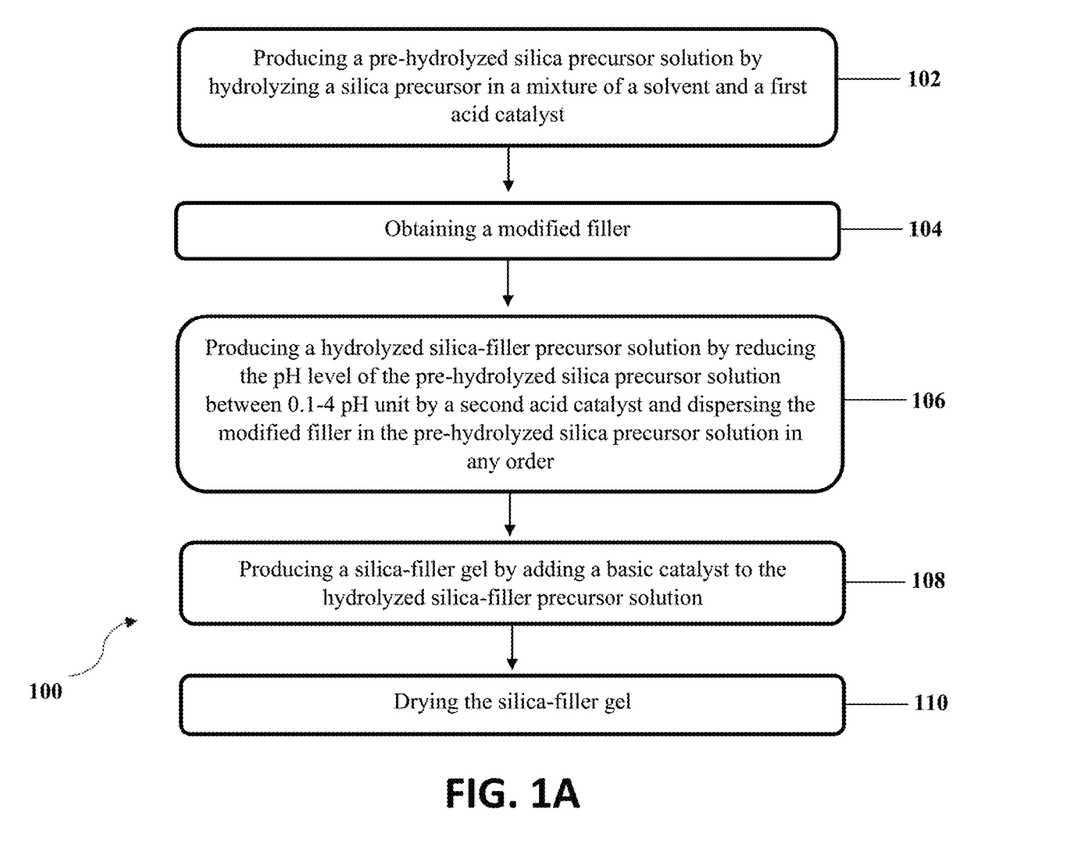
FIG. 1A illustrates a method of producing an ultra-tough nanocomposite silica aerogel, consistent with one or more exemplary embodiments of the present disclosure.

In an exemplary embodiment, FIG. 1A illustrates a method of producing an ultra-tough nanocomposite silica aerogel, consistent with one or more exemplary embodiments of the present disclosure In detail, the exemplary method 100 may include producing a pre-hydrolyzed silica precursor solution by hydrolyzing a silica precursor in a mixture of a solvent and a first acid catalyst (step 102), obtaining a modified filler (step 104), producing a hydrolyzed silica-filler precursor solution by reducing the pH level of the pre-hydrolyzed silica precursor solution between 0.1-4 pH level by a second acid catalyst and dispersing the modified filler in the pre-hydrolyzed silica precursor solution in any order (step 106), producing a silica-filler gel by adding a basic catalyst to the hydrolyzed silica-filler precursor solution (step 108), and drying the silica-filler gel (step 110).

With further respect to step 102, producing the pre-hydrolyzed silica precursor solution may include stirring for 0.08-100 hour at 0-80° C. In an exemplary embodiment, the silica precursor may include one or more of rice husk, aluminosilicates, silicates, alkoxysilanes, polysilylated organic molecules, silylated molecules, and water glass. Furthermore, the solvent may include water or an alcohol-water mixture and the alcohol may include one or more of methanol, ethanol, propanol, butanol and other alkanols. The first acid catalyst may include one or more of oxalic acid, citric acid, and acetic acid.

Figure 1B:
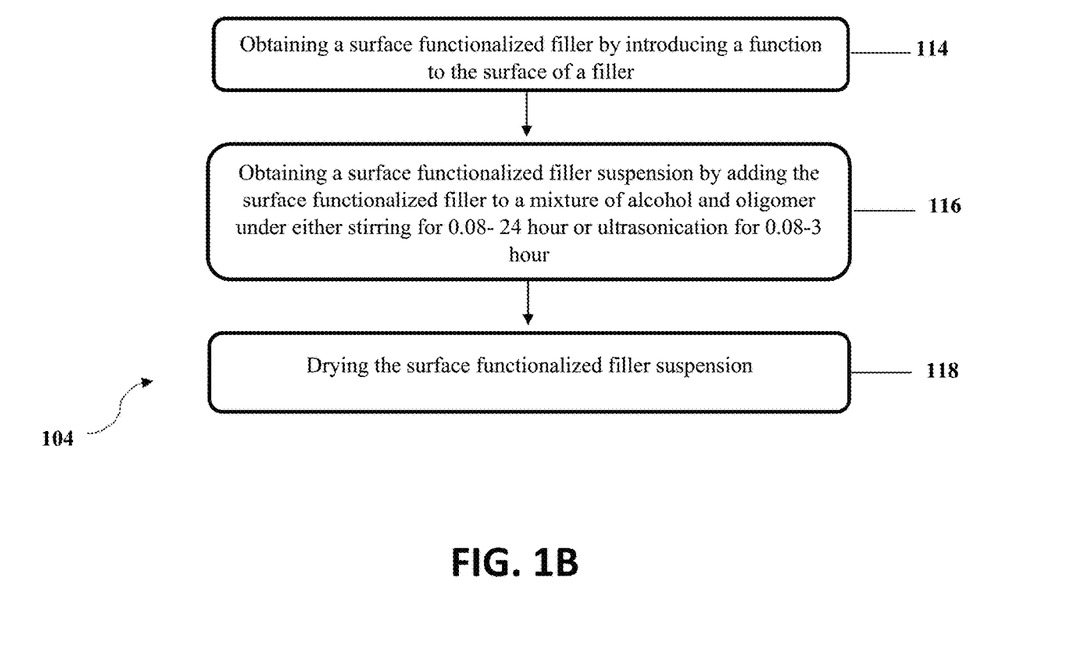
FIG. 1B illustrates a method of obtaining a modified filler, consistent with one or more exemplary embodiments of the present disclosure.

With respect to step 104, obtaining a modified filler may be performed by way of method 112 of FIG. 1B. FIG. 1B illustrates a method of producing the modified filler, consistent with one or more exemplary embodiments of the present disclosure. Exemplary method 112 may include obtaining a surface functionalized filler by introducing a function to the surface of a filler (step 114), obtaining a surface functionalized filler suspension by adding the surface functionalized filler to a mixture of alcohol and oligomer under either stirring for 0.08-24 hour or ultrasonication for 0.08-3 hour (step 116), and drying the surface functionalized filler suspension (step 118).

With further respect to step 114, introducing the function to the surface of the filler may include adding at least one function such as but not limited to hydroxyl group and hydroxyl terminated molecules into the surface of the filler to change its surface properties and facilitate its dispersion, in the silica precursor solution. In an exemplary embodiment, the filler may include one or more of graphene, graphite, clay, alumina, titanic, zirconia silica, silicon carbide, metal, oxides, semi-metal oxides, layered double hydroxides, silicates, and aluminosilicates.

With further respect to step 116, the oligomer may include at least one of organic polymer or inorganic polymer with hydroxyl groups and the alcohol may include one or more of methanol, ethanol, propanol, butanol, and other alkanols.

With further respect to step 118, drying the surface functionalized filler suspension may include one or more of ambient pressure drying in the range of 0.9-2 atmosphere, freeze drying, or supercritical drying. With further respect to step 106 of FIG. 1A, producing the hydrolyzed silica-filler precursor solution by reducing the pH level of the pre-hydrolyzed silica precursor solution between 0.1-4 pH level by a second acid catalyst and dispersing the modified filler in the pre-hydrolyzed silica precursor solution in any order may comprise of reducing the pH level of the pre-hydrolyzed silica precursor solution between 0.1-4 pH level by adding a second acid catalyst to the pre-hydrolyzed silica precursor solution. In an exemplary embodiment, the second acid catalyst may include one or more of organic acids and inorganic acids and the modified filler may be in the range of 0.1-60 weight percent of the silica precursor in the silica-filler gel.

Furthermore, producing the hydrolyzed silica-filler precursor solution by reducing the pH level of the pre-hydrolyzed silica precursor solution between 0.1-4 pH level by a second acid catalyst and dispersing the modified tiller in the pre-hydrolyzed silica precursor solution in any order may comprise stirring for 0.08-100 hour at 0-80° C.

Furthermore, with further respect to step 108, producing the silica-filler gel by adding the basic catalyst to the hydrolyzed silica-filler precursor solution may include producing the silica-filler gel by adding one or more of alkaline earth metal hydroxides, alkali metal hydroxides, and ammonia.

Furthermore, with respect to claim 110, drying the silica-filler gel may include one or more of ambient pressure drying under a pressure of 0.9-2 atmosphere, freeze drying, or supercritical drying.

Figure 2:
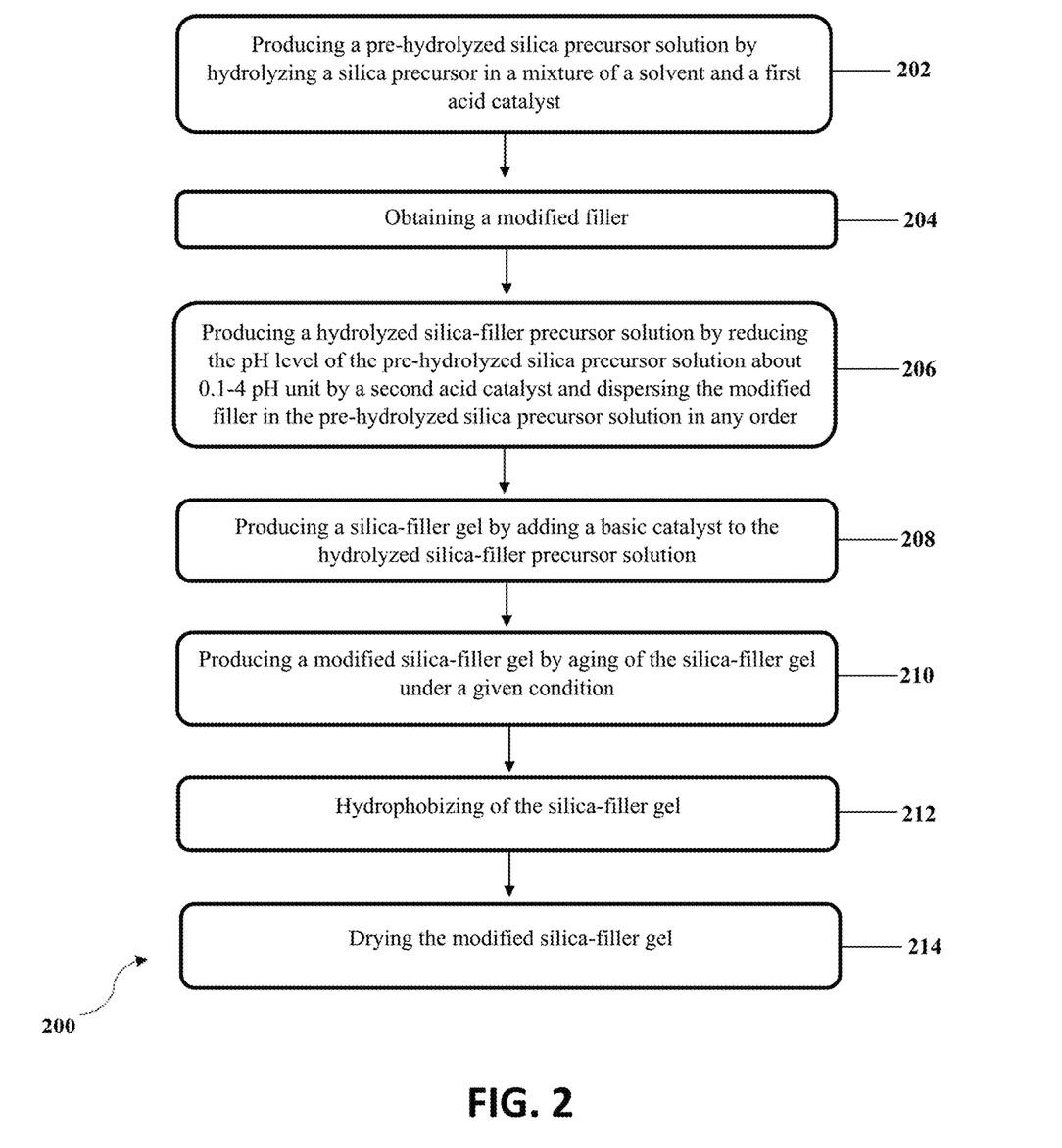
FIG. 2 illustrates a method of producing an ultra-tough nanocomposite silica aerogel, consistent with one or more exemplary embodiments of the present disclosure.

FIG. 2 illustrates a method of producing an ultra-tough nanocomposite silica aerogel, consistent with one or more exemplary embodiments of the present disclosure.

In detail, exemplary method 200 may include producing a pre-hydrolyzed silica precursor solution by hydrolyzing a silica precursor in a mixture of a solvent and a first acid catalyst (step 202), obtaining a modified filler (step 204), producing a hydrolyzed silica-filler precursor solution by reducing the pH level of the pre-hydrolyzed silica precursor solution between 0.1-4 pH level by a second acid catalyst and dispersing the modified filler in the pre-hydrolyzed silica precursor solution in any order (step 206), producing a silica-filler gel by adding a basic catalyst to the hydrolyzed silica-filler precursor solution (step 208), producing a modified silica-filler gel by aging of the silica-filler gel under a given condition (step 210), hydrophobizing of the silica-filler gel (step 212), and drying the silica-filler gel (step 214).

Furthermore, with further respect to the exemplary method 200, applying aging of the silica-filler gel (step 210) may improve the strength of the silica-filler aerogel and applying hydrophobizing of the silica-filler gel (step 212) may prevent destruction of the silica-filler aerogel under humid environment.

Furthermore, with further respect to step 210, producing the modified silica-filler gel by aging of the silica-filler gel under the given condition may include keeping the silica-filler gel for 1-1000 hour under a temperature ranging from 30-120° C. and a pressure ranging from 0.9-5 atmosphere to completion of the polymerization process and mechanical improvement of the structure of the silica-filler gel.

Furthermore, with further respect to step 212, hydrophobizing of the silica-filler gel may include adding a surface hydrophobization agent to a solvent under stirring at 25-60° C. for 1-100 hours. In an exemplary embodiment, the surface hydrophobization agent may include hexamethyl disilazan (HDMZ), trimehylecholorosilan (TMCS), bis(t-rimethylsilyl acetamide) (BTSA), methyltrimethoxysilane (MTMS), methyltriethoxysilane (MTES), Vinyltrimethoxy silane (VTMS), phenyltrimethoxy silane (PTES), Dimethyl dimethoxy silane (DMDS), Trimethylmethoxy silane, Trimethylmethoxy silane, trimethylchlorosilane (TMCS), bis(trimethylsilyl acetamide (BTSA), and any combination thereof. In an exemplary embodiment, the solvent may elude one or more of alkanols and non-aprotic solvents.

In an exemplary embodiment, the solvent of silica precursor solution may include water or an alcohol-water mixture, the alcohol may include one or more of methanol, ethanol, propanol, butanol and other alkanols, with a mass ratio of water in the alcohol-water mixture between 10-100%.

In an exemplary embodiment, the hydrolyzed silica-filler precursor solution may include silica precursor in the range of 0.1-60 weight percent of the hydrolyzed silica-filler precursor solution.

In an exemplary embodiment, the surface hydrophobization agent may be in the range of 0.5-50 weight percent of the solvent.

In an exemplary embodiment, the solvent of supercritical drying may include carbon dioxide, water, or alcohol includes methanol, ethanol, propanol butanol and other alkanols.

In an exemplary embodiment, the filler may include one or more of graphene, graphite, clay, alumna, titanic, zirconia, silica, silicon carbide, metal oxides, semi-metal oxides, layered double hydroxides, silicates, aluminosilicates, and other mineral fillers.

In an exemplary embodiment the clay may be selected from a group including montmorillonite, halloysite, kaolinite, bentonite, laponite, or any type of clay.

In an exemplary embodiment, morphology of the nanocomposites, the microstructure analysis, the specific surface area, the pore size distribution, the mechanical properties, the thermal conductivity may be as using characterization methods including X-ray diffraction (XRD), field emission scanning electron microscopy (FE-SEM) Brunaure-Emmitt-Teller (BET) Barrett-Joyner-Halenda Joyner-Halenda (BJH), universal tensile testing machine, or hot wire method, as described in examples below.

EXAMPLE 1: PRODUCING MODIFIED CLAY

In Example 1, a modified clay was produced consistent with the teachings of the exemplary embodiments of the present disclosure. In this exemplary, utilizing exemplary method 112 of FIG. 1B, a 5 wt. % suspension of Cloisite 30B in alcohol was prepared. Then, 0.25% Hydroxy terminated poly (dimethylsiloxane) (PDMS) was added to this suspension. The suspension remained under continuous stirring overnight at 60° C. and then the solvent removed by freeze drying process.

Figure 3:
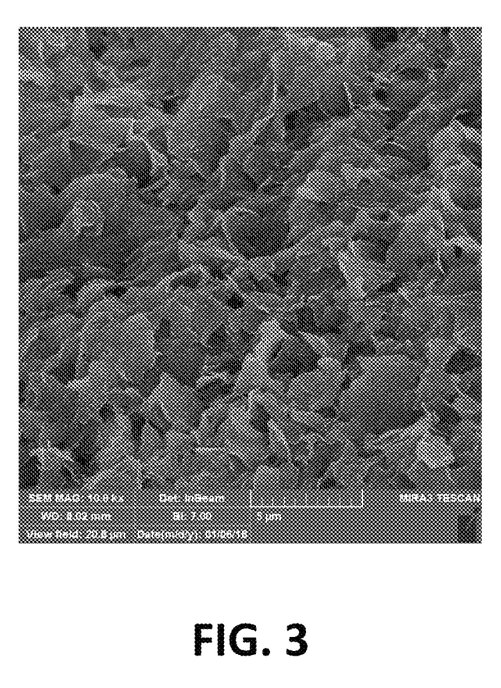
FIG. 3 illustrates a scanning electron microscope (SEM) image of an implementation of the modified clay, consistent with one or more exemplary embodiments of the present disclosure.

FIG. 3 illustrates a scanning electron microscope (SEM) image of an implementation of the modified clay, consistent with one or more exemplary embodiments of the present disclosure.

It may be seen that using this exemplary method, a layered structure in modified clay was formed. The thickness of the layers was less than 30 nm and the distance between the layers is more than 200 nm.

EXAMPLE 2: PRODUCING NEAT AEROGEL

In Example 2, a neat aerogel was produced utilizing exemplary methods. In this example, a neat aerogel was synthesized by sol-gel polymerization of tetraethylorthosilicate (TEOS) in ethanol/water mixture solution. The amount of acidic catalyst was adjusted in order to achieve pH level equal to 3. The molar ratios of TEOS:ethanol(EtOH):$H_2O$: oxalic acid:$NH_4OH$ were fixed at $1:6.5:6:8.7*10^{-1}:3*10^{-4}$. Hydrolysis was conducted under stirring at 60° C. overnight. After hydrolysis, remaining $H_2O$ and ethanol and basic catalyst were mixed in another beaker and these two solutions were combined and poured into a cylindrical mold where the sol was solidified to neat aerogel. The solvent of neat gel was exchanged 3 times with ethanol by soaking the neat gel into the pure ethanol.

Thereafter, aging of neat gel was carried out at 50° C. for 24 hrs. The hydrophobization of the neat gel was carried out using a 3 wt. solution of TMCS in ethanol at 60° C. for 24 hours. This process was repeated three times. The ratio of TEOS/TMCS was fixed at 1:2. Finally, the samples were dried using a supercritical carbon dioxide drying chamber.

EXAMPLE 3: THREE STEP SOL-GEL METHOD

In Example 3, a nanocomposite aerogel was produced consistent with the teachings of the exemplary embodiments of the present disclosure. In this example, utilizing exemplary method 120 of FIG. 1C, a nanocomposite aerogel was prepared by pre-hydrolyzing of a solution containing 1:3:3 ratios of TEOS:EtOH:$H_2O$ and oxalic acid at 60° C. for 1 hour. After the addition of modified clay to the solution, oxalic acid was added and the pH of the solution was adjusted at 2.5. Then, the suspension was hydrolyzed at 60° C. overnight. The amount of modified clay was chosen as 4, 5 or 6 wt.% based on the total silica content in the sol. Afterward, remaining ethanol, water, and basic catalyst were mixed and combined with hydrolyzed suspension and poured into a cylindrical mold where the sol was solidified to silica-clay gel. The solvent of silica-clay gel was exchanged 3 times with ethanol by soaking the silica-clay gel into the pure ethanol The aging of silica-clay gel was carried out at 50° C. for 24 hours. The hydrophobization of the silica-clay gel was carried out using a 3 wt.% solution of TMCS in ethanol at 60° C. for 24 hours. This process was repeated three times. The ratio of TEOS/TMCS was fixed at 1:2. Finally, the samples were dried using a supercritical carbon dioxide drying process.

Figure 4A:
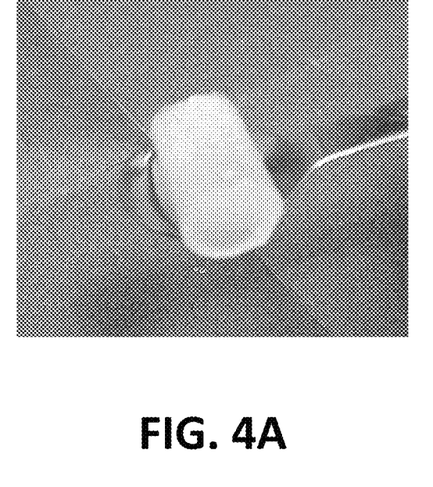
FIG. 4A illustrates a photograph of an implementation of silica-clay gel, consistent with one or more exemplary embodiments of the present disclosure.
Figure 4B:
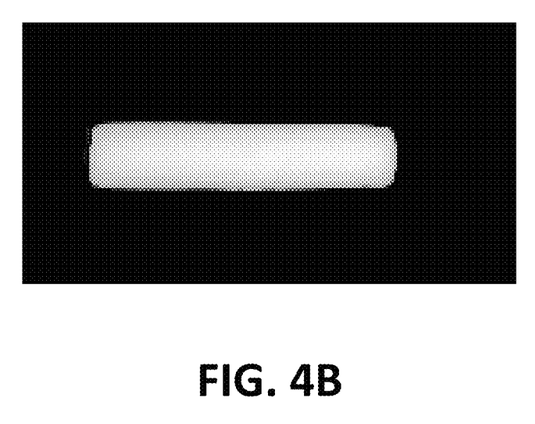
FIG. 4B illustrates, a photograph of an implementation of nanocomposite aerogel, consistent with one or more exemplary embodiments of the present disclosure.

FIG. 4A illustrates a photograph of an implementation of silica-clay gel, consistent with one or more exemplary embodiments of the present disclosure. FIG. 4B illustrates a photograph of an implementation of nanocomposite aerogel, consistent with one or more exemplary embodiments of the present disclosure. FIG. 4A and FIG. 4B reveal that xemplary nanocomposite aerogel is motion and homogeneous.

EXAMPLE 4 MATERIAL CHARACTERIZATION

In this example, the result of some characterization methods performed on exemplary neat aerogel and nanocomposite aerogels (produced as described in detail in connection with Examples 1, 2, and 3) are presented.

TABLE 1. shows the physical properties of samples including contact angle, porosity, and bulk density. The bulk density reported here was obtained by measuring the weight to volume ratio of the samples.

All the samples have high porosity and low density. These results reveal that by utilizing exemplary methods, the addition of modified clay leads to dimensional stability of the samples to be preserved. To investigate the hydrophobicity of the samples, contact angle measurements were carried out. As illustrated in TABLE 1, all neat aerogels and nanocomposite aerogels counterparts have a hydrophobic nature. In addition, the hydrophobicity of the samples has not changed significantly by addition of the modified clay as a filler. However, as illustrated in TABLE 1, all samples have the same density hence due to the well dispersion of the modified filler in the silica aerogel as well as preserving the well-defined and interconnected microstructure of the silica aerogel in the presence of the modified filler], any impact on density isn't present when exemplary methods are utilized.

TABLE 1

Physical properties of the hydrophobic samples

| Samples | Bulk density (g/cm$^3$) | Porosity (%) | Contact angle (°) |
|---|---|---|---|
| Neat aerogel | 0.143 ± 0.005 | 93 | 153 |
| Nanocomposite aerogel (4 wt. % modified clay) | 0.156 ± 0.005 | 92 | 150 |
| Nanocomposite aerogel (5 wt. % modified clay) | 0.154 ± 0.005 | 92 | 151 |
| Nanocomposite aerogel (6 wt. % modified clay) | 0.160 ± 0.005 | 92 | 151 |

XRD results of the cloisite 30B and nanocomposite aerogels in the 2θ ranging from 2° to 10° are presented in TABLE 2. The main characteristic peak of the as-received cloisite 30B is observed at 2θ degree of 4.7°, while no peak is observed for neat aerogel. The characteristic peak of cloisite 30B has disappeared in the all nanocomposite aerogels and it reveals the exfoliation of cloisite 30B in the silica aerogel matrix. As indicated in TABLE 2, XRD results show the disappearance of the cloisite 30B characteristic peak and exfoliated morphology of all nanocomposite aerogels. These results confirm delamination of the cloisite 30B sheets during the three-step sol-gel method. Consequently, there are cloisite 30B sheets dispersed within the prepared silica aerogel matrix.

TABLE 2

The XRD results of the samples in 2θ ranging from 2° to 10°

| Sample | 2θ | d-spacing (A°) | Structure |
|---|---|---|---|
| Cloisite 30B | 4.8 | 18.38 | — |
| Nanocomposite aerogel (4 wt. % modified clay) | — | — | Exfoliated |
| Nanocomposite aerogel (5 wt. % modified clay) | — | — | Exfoliated |
| Nanocomposite aerogel (6 wt. % modified clay) | — | — | Exfoliated |

Figure 5A:
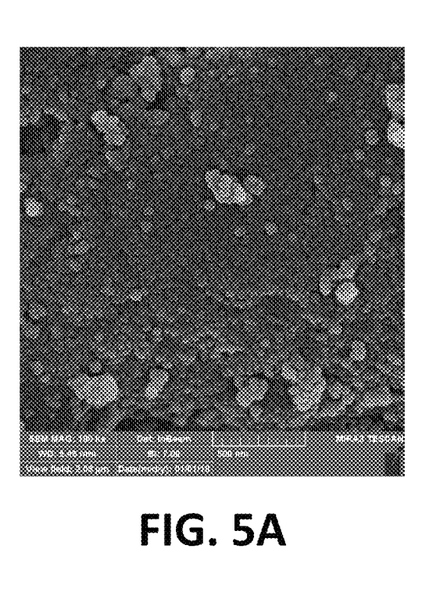
FIG. 5A illustrates a scanning electron microscope (SEM) image of an implementation of the neat aerogel, consistent with one or more exemplary embodiments of the present disclosure.
Figure 5B:
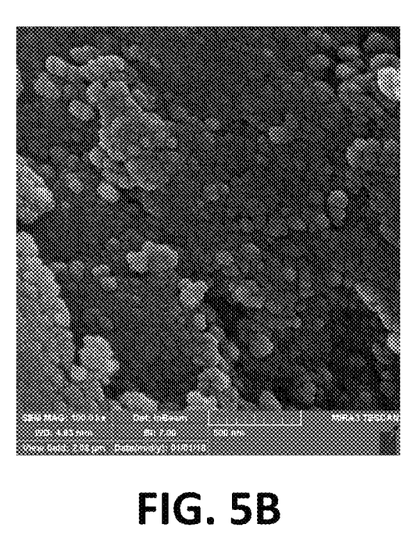
FIG. 5B illustrates a scanning electron microscope (SEM) image of an implementation of the nanocomposite aerogel (5 wt. % modified clay), consistentwith one or more exemplary embodiments of the present disclosure.

FIG. 5A illustrates a scanning electron microscope (SEM) image of an implementation of the neat aerogel, consistent with one or more exemplary embodiments of the present disclosure. FIG. 5B illustrates a scanning electron microscope (SEM) image of an implementation of the nanocomposite aerogel (5 wt. % modified clay), consistent with one or more exemplary embodiments of the present disclosure. As shown in FIGS. 5A and 5B, it may be deduced that both neat and nanocomposite aerogel have colloid-like microstructure. In addition, the stacking of the silicate layers is not observed in FIG. 5B that may be attributed to the delamination and dispersion of the modified clay in the silica aerogel.

Figure 6:
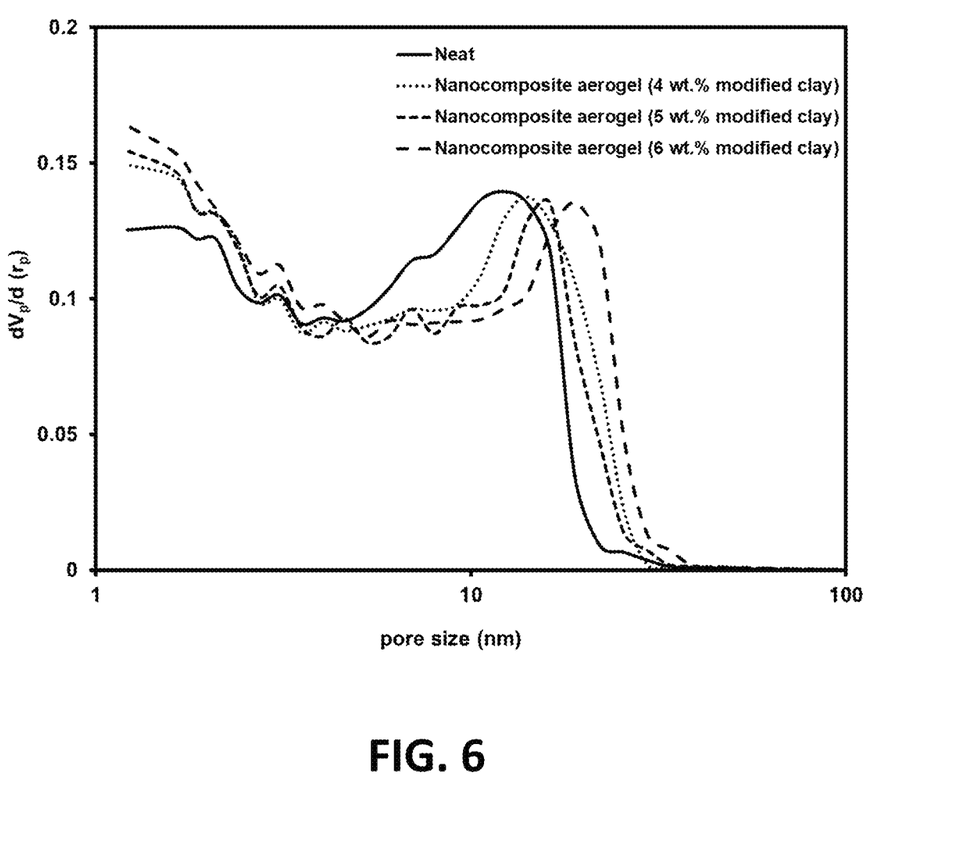
FIG. 6 illustrates a pore size distribution of an implementation of the samples including neat aerogel and nanocomposite aerogels (containing 4, 5 and wt % of modified clay), consistent with one or more exemplary embodiments of the present disclosure.

FIG. 6 illustrates a pore size distribution of an implementation of the samples including neat aerogel and nanocomposite aerogels (containing 4, 5 and wt % of modified clay), consistent with one or more exemplary embodiments of the present disclosure. Specifically, it is apparent that in exemplary aerogels, the addition of modified clay has not changed the pore size distribution. The total pore volume and specific surface area of the prepared aerogels are higher than 2.52 cm$^3$/g and 780 m$^2$/g, respectively.

TABLE 3

Textural properties of samples obtained from BET

| Samples | Pore volume (cm$^3$/g) | Surface area (m$^2$/g) | Isotherm type |
|---|---|---|---|
| Neat aerogel | 2.52 | 780 | type IV |
| Nanocomposite aerogel (4 wt. % modified clay) | 2.70 | 790 | type IV |
| Nanocomposite aerogel (5 wt. % modified clay) | 2.92 | 808 | type IV |
| Nanocomposite aerogel (6 wt. % modified clay) | 3.2 | 802 | type IV |

Furthermore, the specific surface area and pore volume of are increased by, the modified clay addition. The pore size distribution and physisorption isotherm nanocomposite aerogels are almost similar to the neat sample. Modified clay has not changed pore size distribution of the aerogel significantly. These observations together with the FE-SEM results indicate that exemplary methods may preserve the microstructural properties of the silica aerogels in the presence of the modified filler. Nitrogen adsorption-desorption isotherms of the selected samples including neat aerogel and nanocomposite aerogels (containing 4, 5 and wt. % of modified clay) indicated isotherm type IV, based on IUPAC classification, confirming the presence of the mesoporous structure.

The mechanical properties of the silica aerogel and nanocomposite aerogels are shown in TABLE 4. The reported values are the average value of the three tests. These results show that the compression modulus is increased with modified clay loading level. The nanocomposite containing 5 wt. % modified clay shows both the optimum compressive strength and modulus. Moreover, the failure strength in the sample containing 5 wt. % modified clay is very high. The failure strain of this sample is higher than 40% compared with neat aerogel and it indicates that the fragile nature of the silica aerogel is lost through addition of the modified clay when utilizing exemplary methods.

In an exemplary embodiment, compression modulus of the nanocomposite aerogels may be increased with the addition of modified clay that is due to the high modulus of clay platelets. The optimum result has been obtained for the sample containing 5 wt. % modified clay. However, the compression strength of samples shows a different trend, it seems that the compression strength of silica aerogel increases by the addition of modified clay with respect to the neat aerogel. One hand, clay platelets cause to enhance the load transfer as reinforcement. This effect is responsible for improving the mechanical properties at all loading levels. On the other hand, in high filler loading levels, dispersed modified clay platelets may act as a secondary network and this is responsible for the most efficient load bearing in 5 wt. % modified clay nanocomposite. By further increasing the modified clay content, no additional improvement is observed. This is the reason whys the modified loading level has a crucial effect on the mechanical properties of silica aerogels. Improving mechanical properties by the addition of modified clay [how] also aids in preservation of the high porosity in the samples containing modified clay that is reported in TABLE 1. In exemplary embodiments, enhancement in the mechanical properties of the aerogels without significant changes in their density clearly implies the positive impact of modified clay loading on the mechanical properties of silica aerogels.

The changes in the extinction coefficient of nanocomposite aerogels up to 6 wt. % of the modified clay was monotonic with a growing trend. Since the smaller fillers were more efficient at as higher temperature, the escalation in the extinction coefficient by the temperature rise could attribute to the heat-carrying radiation wavelengths. For intermediate temperature range, higher amounts of thermal energy radiated in the 2-15 µm wavelength range. Generally, the heat-carrying wavelengths, as well as the size of nanoparticles, affected the changes in the extinction coefficient by temperature.

The effective thermal conductivity of samples measured by the hot wire method at two selected temperatures. The results were shown in the TABLE. 6. As show in TABLE 6, the addition of modified clay in room temperature led to a monotonic increase of the thermal conductivity of aerogel,

TABLE 4

Mechanical properties of the neat and nanocomposite aerogels

| Sample | Neat aerogel | Nanocomposite aerogel (4 wt. % modified clay) | Nanocomposite aerogel (5 wt. % modified clay) | Nanocomposite aerogel (6 wt. % modified clay) |
|---|---|---|---|---|
| Failure strain (%) | 8.30 | 18 | 46.5 | 28 |
| Modulus (MPa) | 1.2 | 5.5 | 7.6 | 6.7 |
| Ultimate strength (MPa) | 0.11 | 2.8 | 3.42 | 1.9 |
| Density (kg/m$^3$) | 143.7 | 156.5 | 154.6 | 160.1 |
| Toughness (kJ/m$^3$) | 3.3 | 180 | 646.6 | 266 |

A thermogravimetric analysis (TGA) is provided in TABLE 5. A drastic weight loss occurred around 272° C. for the neat aerogel. As indicated in TABLE 5, the onset of decomposition temperature increased by modified clay loading level and reached 385° C. for nanocomposite aerogel containing 6 wt. % modified clay. This onset corresponds to oxidation of $CH_3$ groups attaching on silica backbone and remained organic residue. After 600° C. insignificant weight loss occurred, therefore the residue at 600° C. was reported in TABLE 5. The addition of modified clay led to increasing of residue, onset decomposition temperature, and an amount of remaining residue that is attributed to the high thermal stability and thermal barrier properties of the clay.

TABLE 5

A thermogravimetric analysis (TGA)

| Samples | $T_{onset}$ (° C.) | $T_{5\%}$ (° C.) | $T_{max}$ (° C.) | Residue (at 600° C.) (wt. %) |
|---|---|---|---|---|
| Silica aerogel | 272 | 416 | 333 | 86.5 |
| Silica/4 wt. % clay aerogel | 355 | 467 | 415 | 92 |
| Silica/5 wt. % clay aerogel | 376 | 482 | 421 | 91.8 |
| Silica/6 wt. % clay aerogel | 385 | 502 | 451 | 92.3 |

Figure 7:
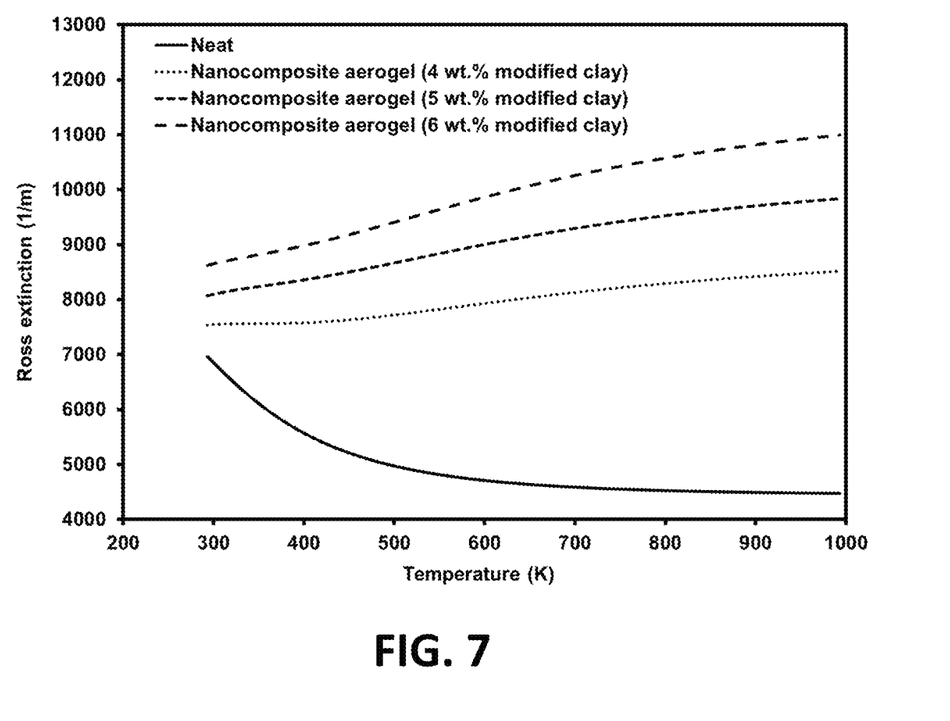
FIG. 7 illustrates Rosseland mean extinction coefficients of an implementation of samples including neat aerogel and nanocomposite aerogels (containing 4, 5 and wt. % of modified clay), consistent with one or more exemplary embodiments of the present disclosure.

By determining spectral extinction coefficient, their temperature dependency may be calculated utilizing equation 4 using Rosseland average function and numerical integration method. FIG. 7 illustrates Rosseland mean extinction coefficients of an implementation of samples including neat aerogel and nanocomposite aerogels (containing 4, 5 and wt. % of modified clay), consistent with one or more exemplary embodiments of the present disclosure.

Rosseland mean extinction coefficient for neat aerogel was smaller than that of nanocomposite aerogels. The difference originated from the intrinsic properties of silica and clay mineral. Also, the increasing of the clay content enhances extinction coefficient of nanocomposite aerogels.

while a different trend was obtained at 293° C. On one hand, for modified clay loading level less than 5 wt. %, the effect of modified clay on the extinction coefficient of aerogel led to decrease of radiative thermal conductivity and consequently decrease of effective thermal conductivity. On the other hand, the effective thermal conductivity was increased in 6 wt. % modified clay loading level. This was due to the incremental effect of modified clay on the solid thermal conductivity of aerogel.

TABLE 6

Measured effective thermal conductivity of samples

| Samples | Thermal conductivity at 25° C. (mW/(m · K)) | Thermal conductivity at 290° C. (mW/(m · K)) |
|---|---|---|
| Neat aerogel | 18 | 27 |
| Nanocomposite aerogel (4 wt. % modified clay) | 19 | 20 |
| Nanocomposite aerogel (5 wt. % modified clay) | 19 | 20 |
| Nanocomposite aerogel (6 wt. % modified clay) | 20 | 21 |

What is claimed is:

1. A method for producing an ultra-tough nanocomposite silica aerogel, comprising:
   producing a pre-hydrolyzed silica precursor solution by hydrolyzing a silica precursor in a mixture of a solvent and a first acid catalyst;
   obtaining a modified filler;
   producing a hydrolyzed silica-filler precursor solution by reducing the pH level of the pre-hydrolyzed silica precursor solution between 0.1-4 pH level by a second acid catalyst and dispersing the modified filler in the pre-hydrolyzed silica precursor solution in any order, wherein the second acid catalyst includes one or more of organic acids and inorganic acids;

producing a silica-filler gel by adding a basic catalyst to the hydrolyzed silica-filler precursor solution; and drying the silica-filler gel, wherein obtaining the modified filler comprises:

obtaining a surface functionalized filler by introducing a function to a filler surface, the filler including one or more of graphene, graphite, clay, alumina, titania, zirconia, silica, silicon carbide, metal oxides, semi-metal oxides, layered double hydroxides, silicates, and aluminosilicates, wherein the function includes at least one selected from the group consisting of hydroxyl group, hydroxyl terminated organic molecules, and hydroxyl terminated organic-inorganic;

obtaining a surface functionalized filler suspension by adding the surface functionalized filler to a mixture of alcohol and oligomer under either stirring for 0.08-24 hour or ultrasonication for 0.08-3 hour, wherein the oligomer comprising at least one of organic polymer or inorganic polymer with hydroxyl groups, the alcohol includes one or more of methanol, ethanol, propanol, butanol, and other alkanols; and drying the surface functionalized filler suspension, the drying includes one or more of ambient pressure drying in the range of 0.9-2 atmosphere, freeze drying, or supercritical drying.

2. The method of claim 1, wherein the ultra-tough nanocomposite silica aerogel has a toughness more than 600 kJ/m$^3$, Rosseland extinction coefficient of at least 8500 m$^{-1}$, a failure strain of more than 45%, and a mechanical strength of more than 3.4 MPa.

3. The method of claim 1, wherein the silica precursor comprises one or more of rice husk, aluminosilicates, silicates, alkoxysilanes, polysilylated organic molecules, silylated molecules, and water glass.

4. The method of claim 1, wherein the hydrolyzed silica-filler precursor solution comprises the modified filler in the range of 0.1-60 weight percent of the silica precursor in the silica-filler gel.

5. The method of claim 1, wherein the solvent comprising water or an alcohol-water mixture, the alcohol includes one or more of methanol, ethanol, propanol, butanol, and other alkanols.

6. The method of claim 1, wherein the first acid catalyst includes one or more of oxalic acid, citric acid, and acetic acid.

7. The method of claim 1, wherein producing the pre-hydrolyzed silica precursor solution by hydrolyzing the silica precursor in a mixture of a solvent and a first acid catalyst comprises producing the pre-hydrolyzed silica precursor by stirring for 0.08-100 hour at 0-80° C.

8. The method of claim 1, wherein producing the hydrolyzed silica-filler precursor solution by reducing the pH level of the pre-hydrolyzed silica precursor solution between 0.1-4 pH level by the second acid catalyst and dispersing the modified filler in the pre-hydrolyzed silica precursor solution in any order comprises producing the hydrolyzed silica-filler precursor solution by stirring for 0.08-100 hour at 0-80° C.

9. The method of claim 1, wherein the basic catalyst comprises one or more of alkaline earth metal hydroxides, alkali metal hydroxides, and ammonia.

10. The method of claim 1, wherein drying the silica-filler gel comprises drying using one or more of ambient pressure drying under a pressure of 0.9-2 atmosphere, freeze drying or supercritical drying.

\* \* \* \* \*